United States Patent [19]
Deguchi et al.

[11] Patent Number: 5,701,310
[45] Date of Patent: Dec. 23, 1997

[54] DATA DETECTION APPARATUS

[75] Inventors: Hironori Deguchi, Kadoma; Toshiyuki Shimada, Kobe, both of Japan

[73] Assignee: Matsushita Electric Industrial Co., Ltd., Kadoma, Japan

[21] Appl. No.: 602,490

[22] Filed: Feb. 20, 1996

[30]     Foreign Application Priority Data

Feb. 21, 1995 [JP] Japan .................................. 7-032131

[51] Int. Cl.$^6$ ...................................... G11B 20/18
[52] U.S. Cl. ....................... 371/30; 341/59; 341/94
[58] Field of Search ........................ 371/30, 37.1, 6; 341/59, 94

[56]              References Cited

U.S. PATENT DOCUMENTS 5,170,396  12/1992  Rivers et al. ........................... 371/6
5,491,479   2/1996  Wilkinson ............................. 341/58

*Primary Examiner*—Stephen M. Baker
*Attorney, Agent, or Firm*—Renner, Otto, Boisselle, Sklar

[57]              ABSTRACT

A data detection apparatus retrieved binary data modulated in conformity with the (d, k) constraint from an analog signal includes a timing extracting unit for generating a timing signal representing the timing at which the analog signal crosses the threshold value, a clock generating unit for generating a clock signal having a cycle corresponding to one bit of the binary data from the timing signal, a timing position detector for detecting the position in the cycle of the timing, and an error correcting unit for correcting an error in the binary data in accordance with the detected position.

8 Claims, 14 Drawing Sheets

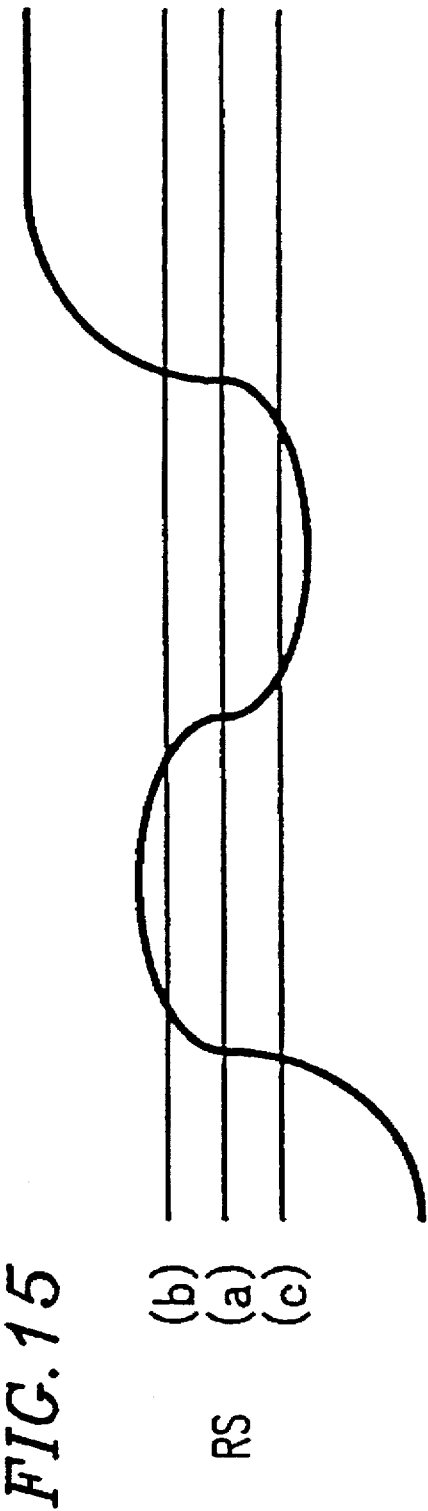

DATA DETECTION APPARATUS

BACKGROUND OF THE INVENTION

1. Field of the Invention

The present invention relates to a reproduction apparatus which detects a signal passed through a transmission line, and more particularly, to a data detecting apparatus which binarizes a reproduced signal passed through the optical disk apparatus transmission line.

2. Description of the Related Art

A received signal obtained from a PCM signal passed through the transmission line or a reproduced signal of a digital recording apparatus such as an optical disk apparatus is obtained as having analog values. A data detection apparatus which retrieves the original data by synchronizing the analog values to the clock component of the PCM signal and binarizing them has been developed with respect to the improved performance of transmission lines or recording apparatuses. Recently, in light of the high performance of such apparatuses, the improvement of a transfer rate and the improvement of a packing density have been attempted for a transmission line and for a digital recording apparatus, respectively, and a variety of data detection apparatuses which effectively utilize a transmission or recording performance is being developed.

It sometimes occurs that a retrieved binary signal having an error is outputted due to distortion or noise during data detection. Specifically, in the formation of pits in an optical disk, the smaller the pit is, the more difficult it is to stably form it in the original size, and consequently, it is likely that the reproduced version of it in the read-out signal becomes of a size smaller than the original when the high recording density is intended. In a reproduction signal processing, an inter-symbol interference in the reproduced waveform having a small pit or a small interval between pits is reduced by the waveform equalization. However, this equalization has its limit in a case of the high recording density. In the reproduced signal of a smaller pit or interval between pits, the interval between symbols becomes smaller than the original. An error increases that a retrieved binary signal does not satisfy the d-constraint of "(d, k) constraint". The (d, k) constraint is a simplification expressed as (d, k) of the (d, k; m, n; r) restraint where a conversion of m bit data into n bit code is taken as one unit, and a post-modulation code data are completed in units or r at the maximum, and the attribute of the post-modulation code data column is such that the number of "0" between "1" and "1" is equal to or more than d, and is equal to or less than k, as described in "The Journal of The Institute of Television Engineers of Japan, Vol. 44, No. 10, p. 1369–1375 (1990)".

A data detection apparatus which corrects such errors is described in Japanese Patent Laid-Open Publication No. 6-243593. The data detection apparatus of this method will be described hereinafter. The reproduced signal obtained through the conventional system is the one obtained by recording and reproducing a binary data recording signal on an optical disk, which is the (d, k) restrained digital data having an arbitrary data pattern modulated by NRZI method.

A reproduced signal obtained through the reproduction system is converted into a retrieved binary signal. This retrieved binary signal is synchronized by the clock component of the reproduced signal to obtain the synchronized binary signal. From this synchronized binary signal is detected an error pattern which does not satisfy the d-constraint and has a smaller number of consecutive "1"s or "0"s than d+1. A short pulse signal which represents the center position of the error pattern before synchronization is also detected using additional signal processing. An error correction is made by inverting a binary value of the neighbor data of the error pattern in the synchronized binary signal using the short pulse signal. In this correction, the neighbor value which is closer in time axis to the center position is inverted. In case of d=2, the minimum number of consecutive "1"s and "0"s becomes three and the number of consecutive "1"s or "0"s is two in most error patterns. One of the two neighbor positions of the error pattern closer to the center position of the error pattern of the pre-synchronization signal is inverted so as to the number of consecutive "1"s or "0"s becomes three for correction.

However, the following problems are present in the above-described conventional art. Namely, an analog signal processing as the additional signal processing is used for deciding the location of an error and this complicates the circuit configuration. Also, in view of the deviation, the stability, or the like of the devices constituting the analogue circuit, it is difficult to ensure a certain level of precision.

SUMMARY OF THE INVENTION

The data detection apparatus for retrieved binary data modulated in conformity with the (d, k) constraint from an analog signal, includes: a timing extracting unit for generating a timing signal representing the timing at which the analog signal crosses the threshold value; a clock generating unit for generating a clock signal having a cycle corresponding to one bit of the binary data from the timing signal; a timing position detecting unit for detecting a position in the cycle of the timing signal; and an error correcting unit for correcting an error in the binary data in accordance with the detected position.

In one embodiment, the timing position detecting unit includes a delay circuit which delays the timing signal by different delay amounts, thereby generating N delay timing signals respectively (N is a natural number equal to or greater than two), and N synchronizers which synchronize the N delay timing signals by the clock signal, thereby generating N data signals in accordance with the N delay timing signals; and the error correcting unit corrects an error in the binary data based on the N data signals.

In another embodiment, the timing position detecting unit includes a delay which delays the clock signal by different delay amounts, thereby generating N delay clock signals respectively (N is a natural number equal to or greater than 2), and N synchronizers which synchronize the timing signal by the delay clock signal, thereby generating N data signals in accordance with the N delay clock signals; and the error correcting unit corrects an error in the binary data based on the N data signals.

In still another embodiment, the timing position detection unit includes a delay which delays the timing signal by a certain delay amount, thereby generating a delay timing signal, and a delay which delays the clock signal by a certain delay amount, thereby generating a delay clock signal, and a synchronizer which synchronizes the timing signal and the delay timing signal by the clock signal and the delay clock signal, thereby generating N data signals corresponding to the delay timing signal and the delay clock signal; and the error correcting unit corrects an error in the binary data based on the N data signals.

In still another embodiment, the timing position detection unit generates three delay timing signals, and the timings represented by the delay timing signals are shifted by about T/3 to one another, where T is the cycle of the clock signal.

In still another embodiment, the timing position detection unit generates three delay clock signals, and the timings represented by the delay clock signals are shifted by T/3 to one another, where T is the cycle of the clock signal.

In still another embodiment, the error correcting unit includes a first counter which counts the number of irregulars of bit "1" for which the number of consecutive "1"s of the binary data does not reach a predetermined number, and a second counter which counts the number of irregulars of bit "0" for which the number of consecutive "0"s of the binary data does not reach a predetermined number, and a threshold controller which varies the threshold value in accordance with the counts of the irregulars of bit "1" and the irregulars of bit "0".

In still another embodiment, the threshold controller varies the step at which the threshold value is varied, in accordance with the difference in the counts of the irregulars of bit "1" and the irregulars of bit "0".

Thus, the invention described herein makes possible the advantage of providing a data detection apparatus which can output a correct retrieved binary signal and performs a highly reliable signal reproduction.

This and other advantages of the present invention will become apparent to those skilled in the art upon reading and understanding the following detailed description with reference to the accompanying figures.

BRIEF DESCRIPTION OF THE DRAWINGS

FIG. 15 is a diagram illustrating a relationship between the threshold value TH and the signal binarized by NRZI.

DESCRIPTION OF THE PREFERRED EMBODIMENTS

Figure 1:
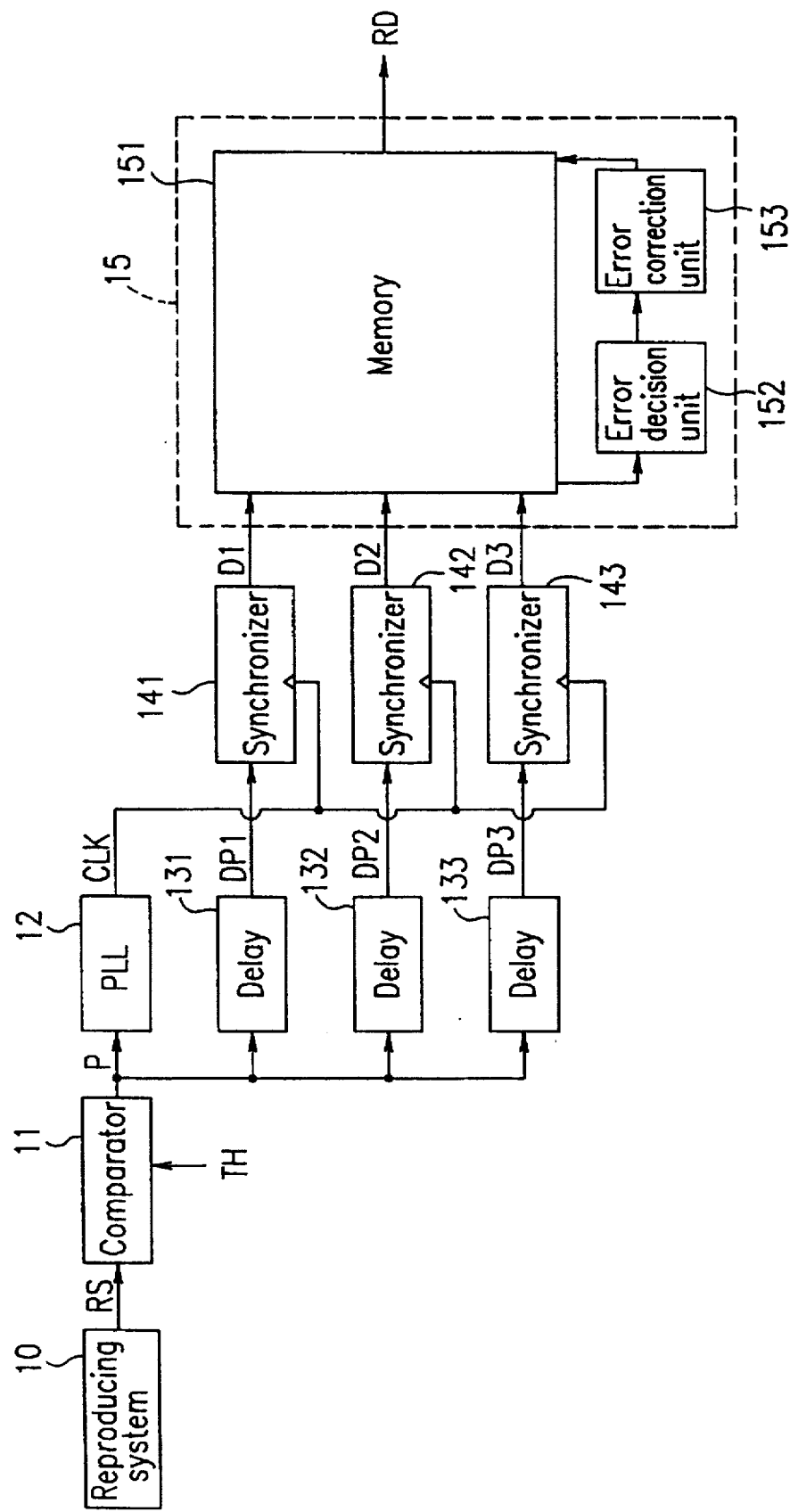
FIG. 1 is a block diagram illustrating a first example of a data detection apparatus according to the present invention.

Hereinafter, examples of the present invention will be described with reference to the attached figures. The same reference numerals and symbols are to mean the same parts throughout.

EXAMPLE 1

Figure 2:
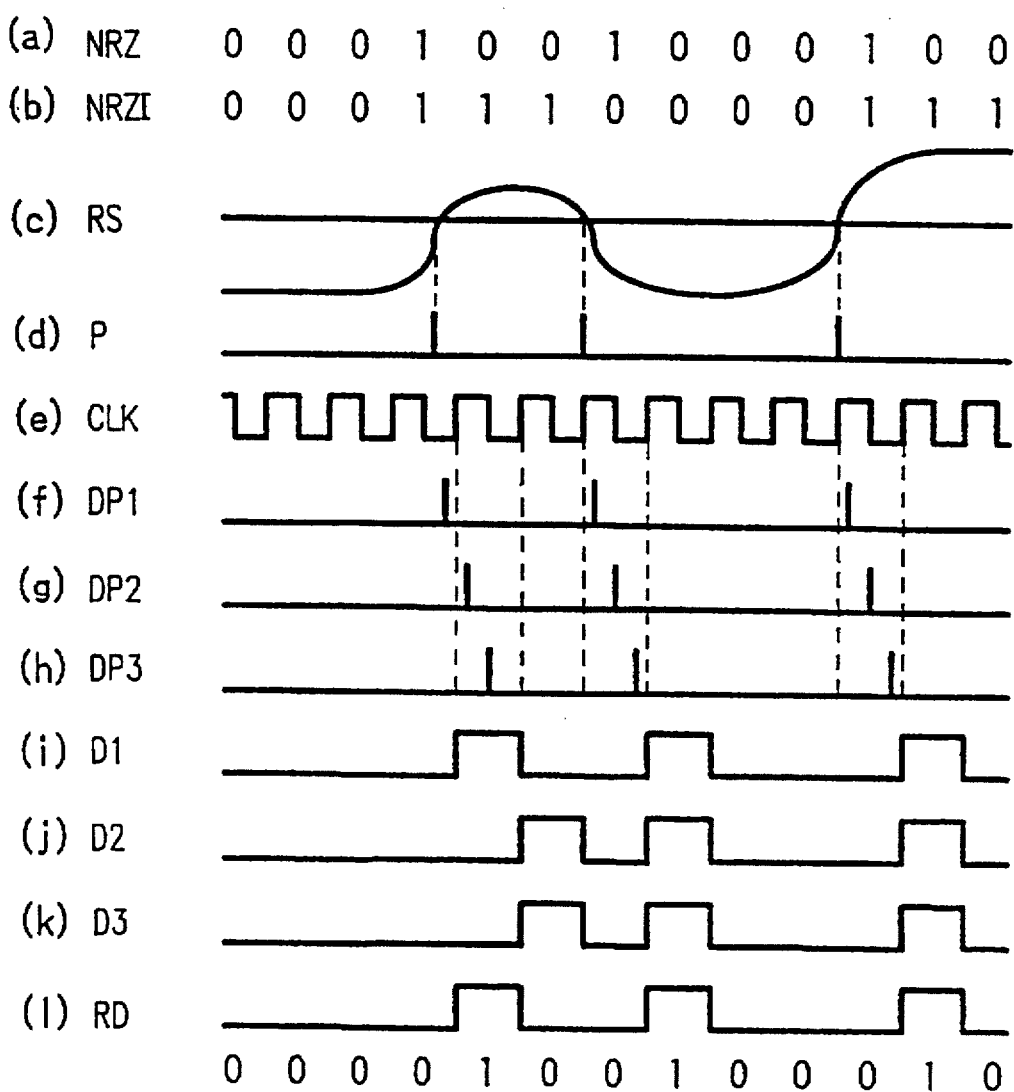
FIG. 2 is a timing chart in the first example.

FIG. 1 is a block diagram illustrating a first example of a data detection apparatus according to the present invention. FIG. 2 is a timing chart in the first example. In FIG. 2, (a) illustrates the binary data of NRZ (non return to zero) method having an arbitrary data pattern and modulated by the (d, k) constraint, and (b) illustrates the binary data obtained by converting the binary data shown in (a) into NRZI (non return to zero inverted) method. This binary data modulated by NRZI method are recorded on, for example, an optical disk with "1" being a mark. The (c) of FIG. 2 illustrates the waveform of the signal reproduced from the optical disk by the reproduction system 10 in FIG. 1. In the following description, it is assumed that d=2 in the above-mentioned (d, k) constraint.

A comparator 11 receives a signal RS ((C) of FIG. 2) which is reproduced by the reproduction system 10 and compares with a predetermined threshold value TH. When the level of the signal RS equals to the threshold value TH, the comparator 11 outputs a signal P ((d) of FIG. 2) which is a binary signal having a narrow pulse width. A PLL (phase locked loop) 12 receives the signal P and, based on the signal P, outputs a signal CLK ((e) of FIG. 2) whose one cycle corresponds to one bit of the binary data to synchronizers 141–143 as a synchronization clock. The PLL 12 is constituted of, for example, a voltage control oscillator, an integrator, and a comparator.

Delays 131–133 receive the signal P outputted from the comparator 11, delay the signal P by (Td–t/3), Td, and (Td+T/3), respectively, and output them to the synchronizers 141–143 as signals DP1–DP3, respectively. The (f)–(h) of FIG. 2 illustrate the waveforms of the signals DP1–DP3. Here, the time Td is the reference delay time for correcting the delay amount in the PLL 12 and the delays 131–133, and the time T is the one cycle of the signal CLK.

The synchronizer 141 makes the signal D1 to be "1" at the timing that the signal CLK becomes "1 (high level)" for the first time after the rise edge of the signal DP1, and makes the signal to be "0 (low level)" after the time T. The synchronizers 142 and 143 also receive the signals DP2 and DP3, respectively, perform the similar operation as the synchronizer 141, and output the signals D2 and D3, respectively. The (i)–(k) of FIG. 2 illustrate the waveforms of the signals D1–D3, respectively.

Figure 3:
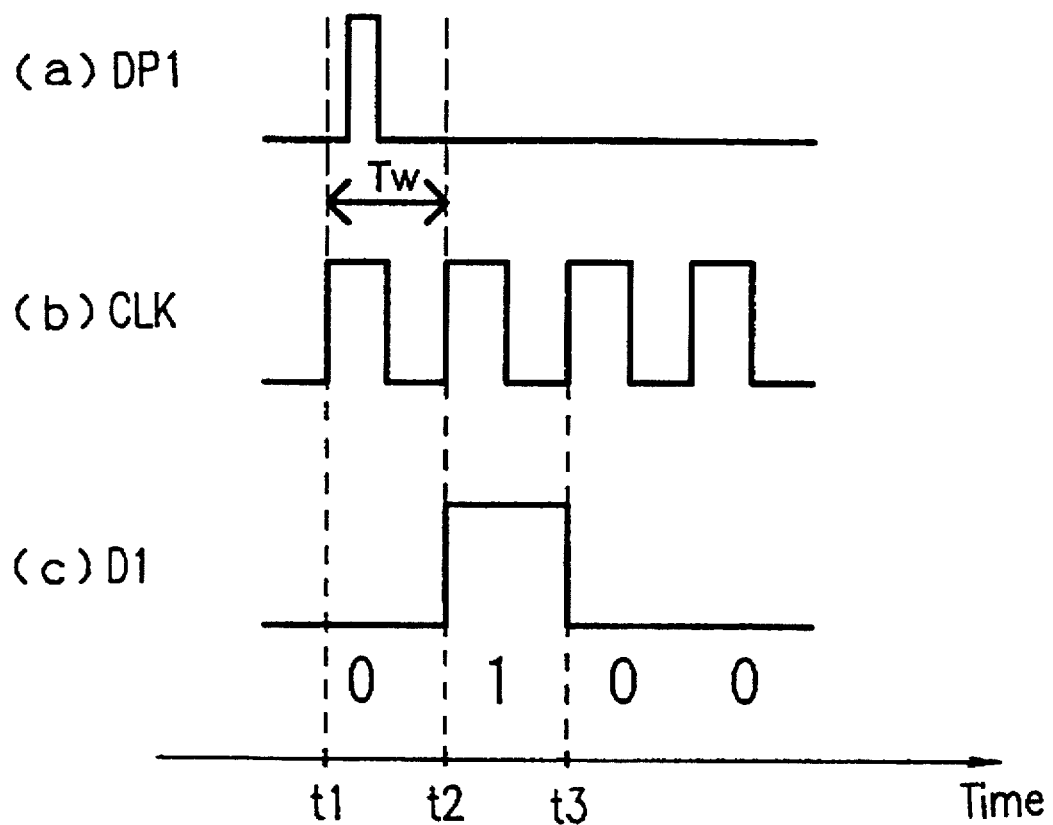
FIG. 3 is a timing chart for the signal DP1, the signal CLK, and the signal D1.

FIG. 3 is a timing chart for the signal DP1, the signal CLK, and the signal D1. When the rise edge of the signal DP1 is positioned between the times t1 and t2 (period Tw), the signal D1 changes from "0" to "1" at the time t2 and "1" to "0" at the time t3. The range indicated by the period Tw is hereinafter referred to as "detection window".

Figure 4:
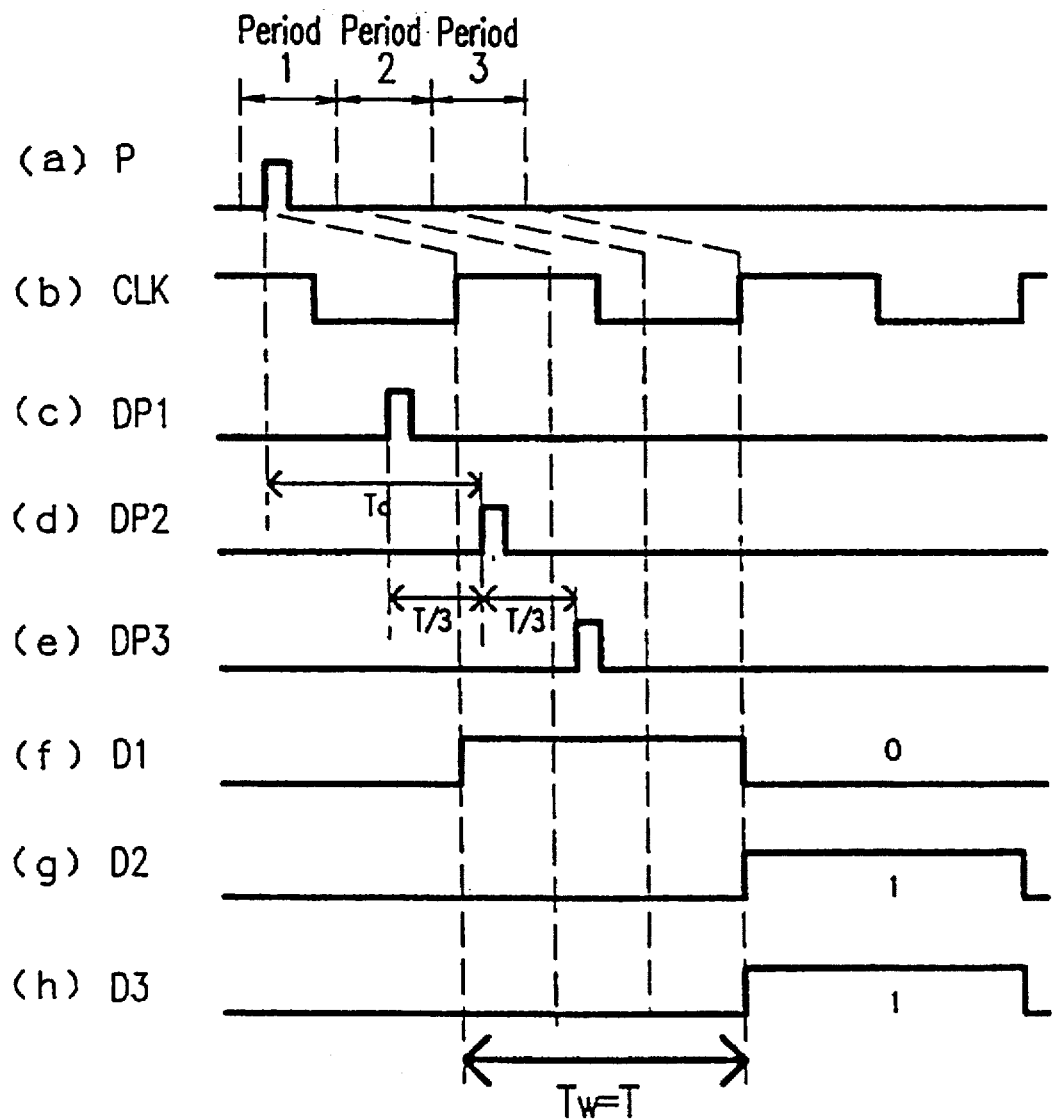
FIG. 4 is the timing chart when the rise edge of the signal P is positioned in the period 1 of the detection windows.

FIG. 4 is the timing chart when the rise edge of the signal P is positioned in the period 1 of the detection windows. Here, the "period 1" refers to a first T/3 of the period on the time axis corresponding to the detection window (i.e., the period which starts at the rise edge of the signal CLK and ends at the next rise edge). Similarly, the "period 2" and the "period 3" hereinafter refer to a T/3 immediately after the period 1 and a last T/3, respectively, of the area corresponding to the detection window. Hereinafter, the expression "a rise edge of a signal is positioned in a period" is simply to be stated as "a signal is positioned in a period" for purposes of simplification.

In a case that the signal P is positioned in the period 1 of the detection window as shown in (a) of FIG. 4, the signals DP1–DP3 become as illustrated in (c)–(e) of FIG. 4, respectively. The (b) of FIG. 4 illustrates the signal CLK. As shown in the (f)–(h) of FIG. 4, the signals D1–D3 are outputted at the timing of synchronizing with the signal CLK based on the signals DP1–DP3. Therefore, when the signals D1–D3 become "0", "1", and "1", respectively, it can be decided that the signal P is positioned in the period 1 of the detection window.

Figure 5:
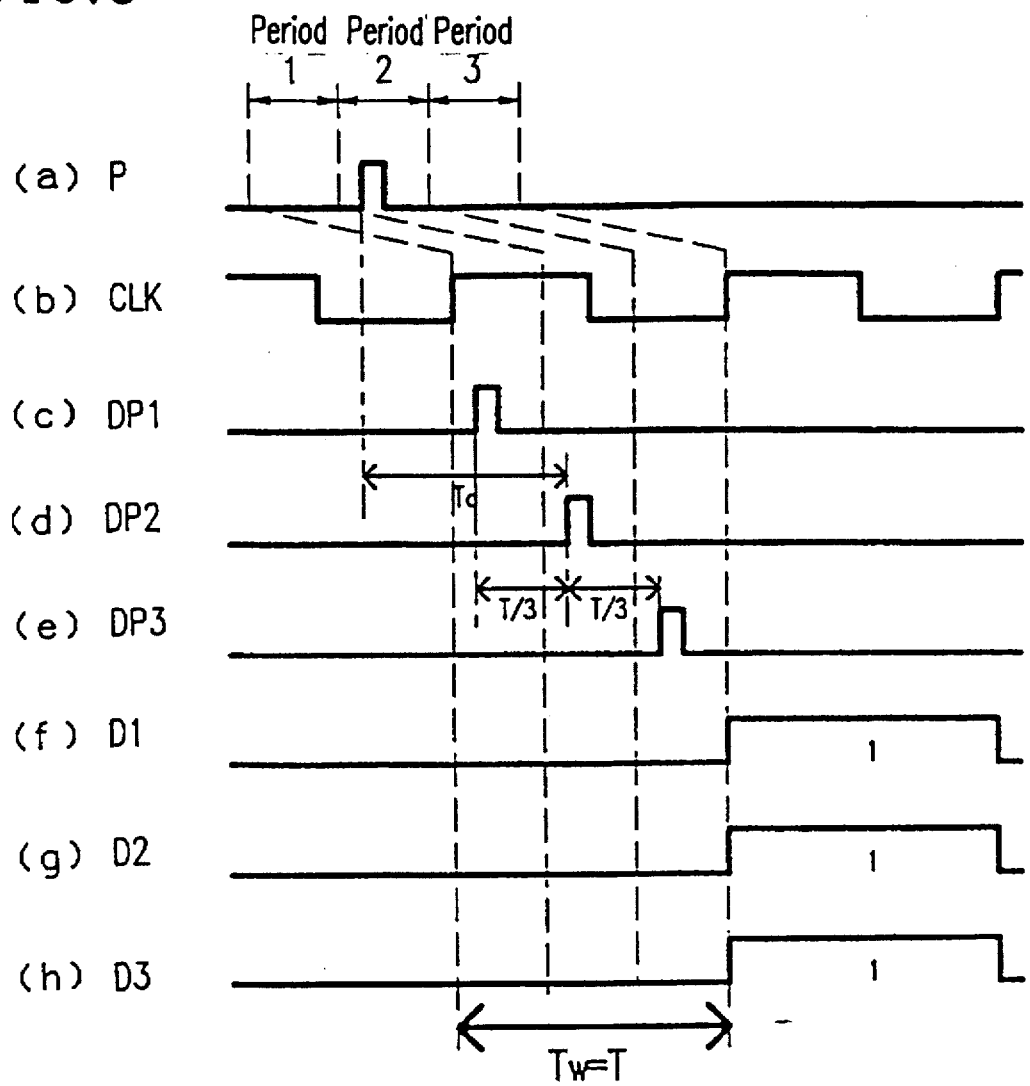
FIG. 5 is the timing chart when the signal F is positioned in the period 2 of the detection window.
Figure 6:
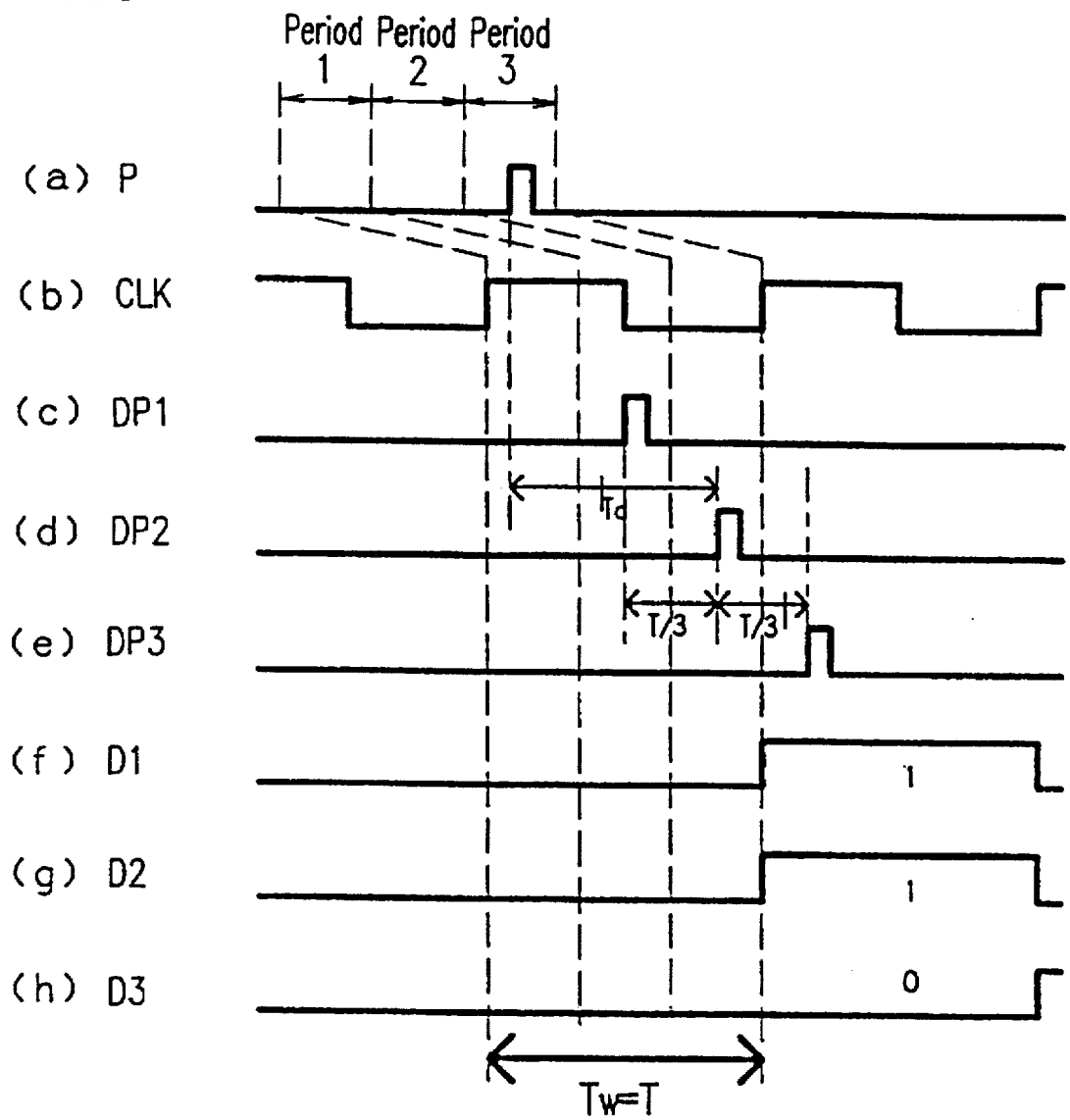
FIG. 6 is the timing chart when the signal F is positioned in the period 3 of the detection window.

FIG. 5 is the timing chart when the signal P is positioned in the period 2 of the detection window. Similarly, when the signals D1–D3 become "1", "1", and "1", respectively, it can be decided that the signal P is positioned in the period 2 of the detection window. FIG. 6 is the timing chart when the signal P is positioned in the period 3 of the detection window. Similarly, when the signals D1–D3 become "1", "1", and "0", respectively, it can be decided that the signal P is positioned in the period 3 of the detection window. When the signal P is not positioned in any of the periods of the detection window, then the signal D2 becomes "0".

A decision device 15 has a memory 151, an error decision unit 152, and an error correction unit 153. The memory 151 stores data represented by the signals D1–D3. The error decision unit 152 detects that the stored data do not satisfy the (d, k) constraint (that the data include an error) if such is the case, and outputs a control signal representing whether or not the (d, k) constraint is satisfied to the error correction unit 153. The error correction unit 153 receives the control signal outputted by the error decision unit 152, and if the data include an error, the error correction unit 153 outputs a control signal for correcting the error of the data stored in the memory 151 based on a predetermined logic.

In the following description, the successive rise edges of the signal CLK are assumed to be positioned at time t(n−4), t(n−3), t(n−2), t(n−1), and t(n). Hereinafter, an expression such as "the data represented by the signal D1 at the time t(n)" is stated as "the data D1(n)" for purposes of simplification.

The memory 151 stores the data D1(n−4)–D1(n), D2(n−4)–D2(n), and D3(n−4)–D3(n). The error decision unit 152 decides that there is an error in the data when the data represented by the signal D2 do not satisfy the d-constraint, in other words, when a portion of the data D2 includes a pattern which does not satisfy the predetermined constraint which binary data modulated by a predetermined method should satisfy. Here, the consideration is given of the case that d=2 and the (d, k) constraint is not satisfied. Therefore, the memory 151 decides that the data D2 includes an error when there is a pattern that the number of "0" between "1" and "1" is zero or one. Specifically, when the data D2(n−4)–D2(n) includes a pattern "01010" or "0110", it is decided that the data D2 include an error.

When the data D2(n−4)–D2(n) are "0", "1", "0", "1", and "0", respectively, it is either that the data D2(n−1) and D2(n) include an error or that the data D2(n−4) and D2(n−3) include an error. In order to decide which is the case, the error correction unit 153 utilizes on which period of the detection window the signal P is positioned at the times t(n−3) and t(n−1). That is, the error correction unit 153 decides whether the data D2(n−1) and D2(n) include an error or the data D2(n−4) and D2(n−3) include an error based on a predetermined logic to be described later and using the data D1(n−3), D3(n−3), D1(n−1), and D3(n−1), and outputs a control signal for correcting the error in the data to the memory 151. The memory 151 receives the control signal outputted by the error correction unit 153 and corrects the error. Specifically, the memory 151 receives the data representing the position of the error of the data as the control signal and corrects the error by inverting the data at the position of the error.

Figure 7:
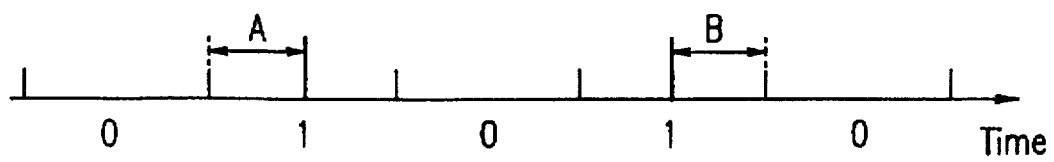
FIG. 7 is a view illustrating a preceding pulse and a succeeding pulse.

FIG. 7 is a view illustrating a preceding pulse and a succeeding pulse. The description will be given as follows of how to obtain the above-mentioned predetermined logic. Suppose there are a preceding pulse and another pulse following thereafter as illustrated in FIG. 7. These pulses are assumed not to have been synchronized by the signal CLK. Let A designate the time between the preceding pulse and the front end of the detection window and B the time between the succeeding pulse and the rear end of the detection window. Then if A<B, it is decided that the preceding pulse includes an error, and if A>B, it is decided that the succeeding pulse includes an error. If A=B, then the decision is inconclusive and either the preceding pulse or the succeeding pulse is regarded as including an error.

Figure 8:
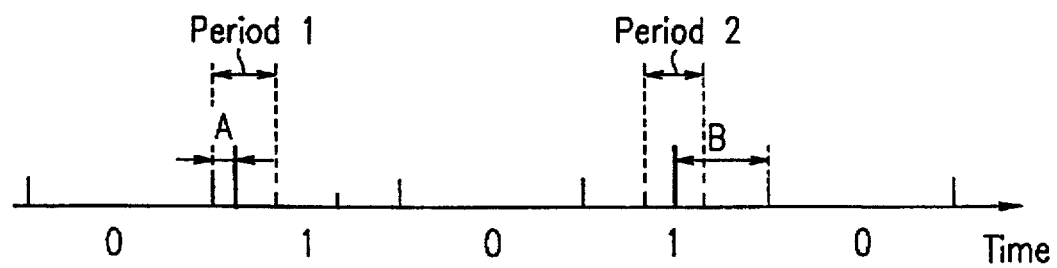
FIG. 8 is a view describing how a predetermined logic is obtained when the delays 131–133 are used.

FIG. 8 is a view describing how a predetermined logic is obtained when the delays 131–133 are used. As illustrated in FIG. 8, when the preceding pulse is positioned in the period 1 of the detection window and the succeeding pulse is positioned in the period 2 of the detection window, A<B and it is decided that the preceding pulse includes an error. When the preceding pulse is positioned in the period 1 of the detection window, D1(n−3)=0 and D3(n−3)=1, and when the succeeding pulse is positioned in the period 2 of the detection window, D1(n−1)=1. Assuming that the preceding pulse includes an error, the position of the error of the data is D2(n−4) and D2(n−3). Therefore, if D1(n−3) =0, D3(n−3) =1, and D1(n−1)=D3(n−1)=1, then it can be decided that the position of the error is D2(n−4) and D2(n−3). The preceding pulse and the succeeding pulse can be positioned in any of the three periods 1–3, respectively, and the number of combinations then becomes 9 (3×3=9). By obtaining the position of the error for each case, the above-mentioned predetermined logic is obtained in the form of a table. Table 1, on the following page, illustrates the predetermined logic when the delays 131–133 are used.

In Table 1, "*" indicates that the decision of whether the error results from the preceding pulse or it results from the succeeding pulse is arbitrary. In Table 1, those with the higher correction rate are selected based on the results of actual measurements. Here, the "correction rate" refers to a rate at which an error that the d-constraint is not satisfied is successfully corrected.

When the data D2(n−3)–D2(n) are "0", "1", "1", and "0", respectively, the error decision unit 152 decides that the data D2(n−3)–D2(n) all include an error and, at the same time, outputs an error decision output representing that the data D2(n−3)–D2(n) all include an error to the error correction unit 153.

TABLE 1

| Preceeding pulse position | D1(n-3) | D3(n-3) | Succeeding pulse position | D1(n-1) | D3(n-1) | Error position | |
|---|---|---|---|---|---|---|---|
| Period 1 | 0 | 1 | Period 1 | 0 | 1 | Preceeding pulse | Y(n-4), Y(n-3) |
| Period 1 | 0 | 1 | Period 2 | 0 | 1 | Preceeding pulse | Y(n-4), Y(n-3) |

TABLE 1-continued

| Preceeding pulse position | D1(n-3) | D3(n-3) | Succeeding pulse position | D1(n-1) | D3(n-1) | Error position | |
|---|---|---|---|---|---|---|---|
| Period 1 | 0 | 1 | Period 3 | 1 | 0 | Succeeding pulse | *Y(n-1), Y(n) |
| Period 2 | 1 | 1 | Period 1 | 0 | 1 | Preceeding pulse | Y(n-4), Y(n-3) |
| Period 2 | 1 | 1 | Period 2 | 1 | 1 | Preceeding pulse | *Y(n-4), Y(n-3) |
| Period 2 | 1 | 1 | Period 3 | 1 | 0 | Succeeding pulse | Y(n-1), Y(n) |
| Period 3 | 1 | 0 | Period 1 | 0 | 1 | Preceeding pulse | *Y(n-4), Y(n-3) |
| Period 3 | 1 | 0 | Period 2 | 1 | 1 | Succeeding pulse | Y(n-1), Y(n) |
| Period 3 | 1 | 0 | Period 3 | 1 | 0 | Succeeding pulse | Y(n-1), Y(n) |

The error correction unit 153 corrects the data which are stored in the memory 151 and include an error based on the error decision output from the error decision unit 152. Ultimately, the memory 151 successively outputs D2(n−4) as the retrieved binary signal RD(n−4) ((1) of FIG. 2).

According to the first example, it is possible to decide the position of the error and corrects them by providing three delays and three synchronizers.

Although the logic illustrated in Table 1 is taken as the predetermined logic in the present invention, other logic may be used for the same purposes. In that case, the method of forming the predetermined logic is as follows. That is, it is formed by statistically obtain the logic that "when the data D1(n−1), D3(n−1), D1(n−3), and D3(n−3) constitute a certain bit pattern, a specific bit includes an error".

Figure 9:
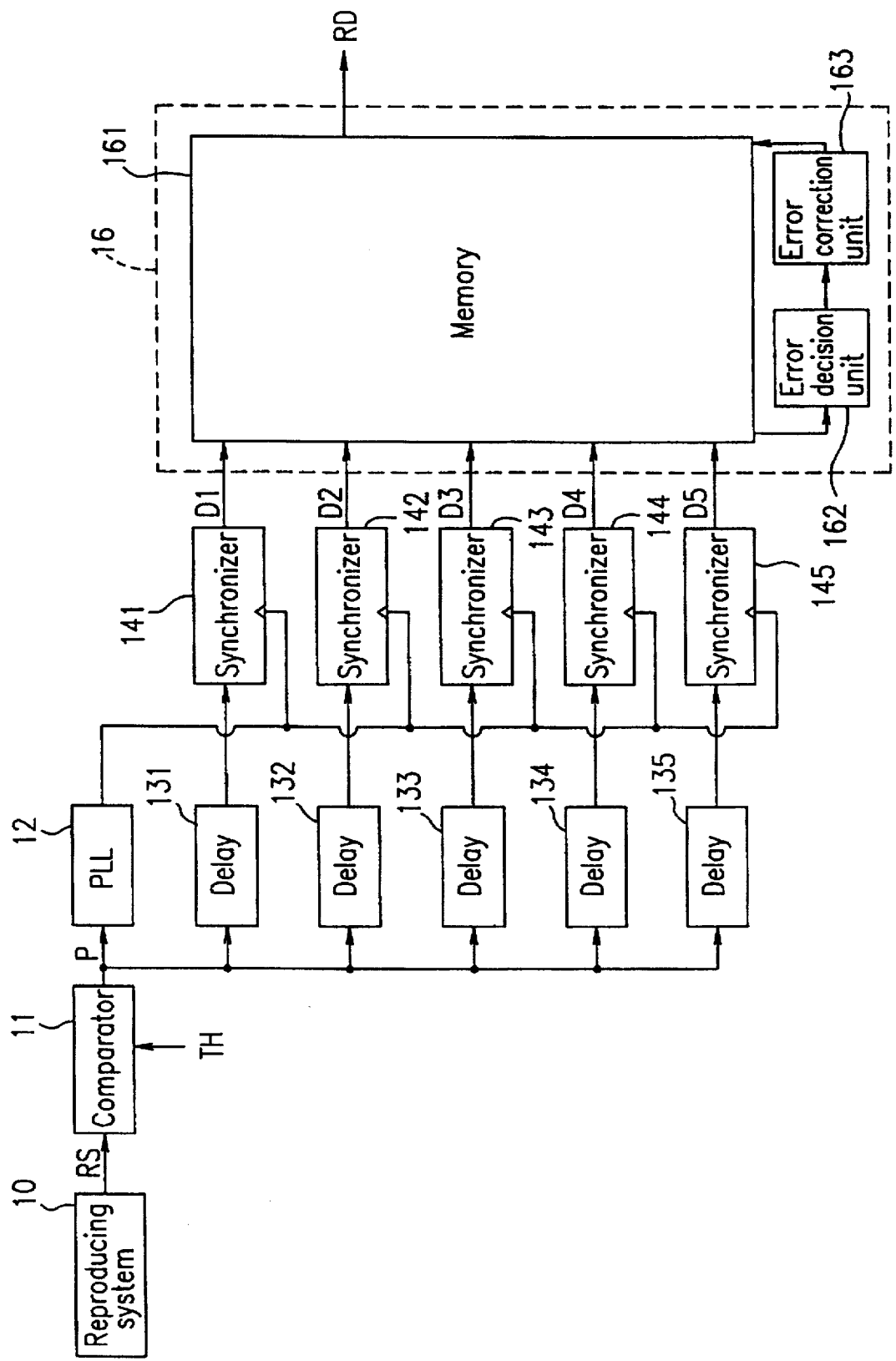
FIG. 9 is a block diagram of a data detection apparatus utilizing five delays 131–135 and five synchronizers 141–145.

Although, in the above description, the delaying is conducted by the three delays, and the synchronization is conducted by the three synchronizers, and the position of the error is decided by using the binary data D1–D3 in the decision maker, the resolution of the position detection in the detection window for the signal P can be raised by using four of the delays and the synchronizer, respectively, or more. FIG. 9 is a block diagram of a data detection apparatus utilizing five delays 131–135 and five synchronizers 141–145. Similarly as described with reference to FIG. 1, signals D1–D5 are produced corresponding to the position of the signal P in the detection window. In FIG. 9, the delay times for the delays 131–135 are (Td−2T/5), (Td−T/5), Td, (Td+T/5), and (Td+2T/5), respectively. Here, the periods obtained by dividing the detection window into five are designated as the periods 1–5, respectively, in the order of appearance on the time axis, the period 1 being the first one. The synchronizers 141–145 output the data D1–D5 corresponding to in which of the periods 1–5 the signal P is positioned to the decision device 16. The decision device 16 has a memory 161, an error decision unit 162, and an error correction unit 163. The decision device 16 receives the data D1–D5, and when it decides that there is an error in the data based on a predetermined logic, it corrects the error and outputs a retrieved binary signal RD. Table 2, on the following page, illustrates the predetermined logic which is used by the error decision unit 162.

In Table 2, "*" indicates that the decision of whether the error results from the preceding pulse or it results from the succeeding pulse is arbitrary. In Table 2, those with the higher correction rate are selected based on the results of actual measurements.

TABLE 2

| Preceeding pulse position | D1 (n − 3) | D2 (n − 3) | D4 (n − 3) | D5 (n − 3) | Succeeding pulse positon | D1 (n − 1) | D2 (n − 1) | D4 (n − 1) | D5 (n − 1) | Error position | |
|---|---|---|---|---|---|---|---|---|---|---|---|
| Period 1 | 0 | 0 | 1 | 1 | Period 1 | 0 | 0 | 1 | 1 | Preceeding pulse | Y(n− 4), Y(n − 3) |
| Period 1 | 0 | 0 | 1 | 1 | Period 2 | 0 | 1 | 1 | 1 | Preceeding pulse | Y(n − 4), Y(n − 3) |
| Period 1 | 0 | 0 | 1 | 1 | Period 3 | 1 | 1 | 1 | 1 | Preceeding pulse | Y(n − 4), Y(n − 3) |
| Period 1 | 0 | 0 | 1 | 1 | Period 4 | 1 | 1 | 1 | 0 | Preceeding pulse | Y(n − 4), Y(n − 3) |
| Period 1 | 0 | 0 | 1 | 1 | Period 5 | 1 | 1 | 0 | 0 | Succeeding pulse | *Y(n − 1), Y(n) |
| Period 2 | 0 | 1 | 1 | 1 | Period 1 | 0 | 0 | 1 | 1 | Preceeding pulse | Y(n − 4), Y(n − 3) |
| Period 2 | 0 | 1 | 1 | 1 | Period 2 | 0 | 1 | 1 | 1 | Preceeding pulse | Y(n − 4), Y(n − 3) |
| Period 2 | 0 | 1 | 1 | 1 | Period 3 | 1 | 1 | 1 | 1 | Preceeding pulse | Y(n − 4), Y(n − 3) |
| Period 2 | 0 | 1 | 1 | 1 | Period 4 | 1 | 1 | 1 | 0 | Succeeding pulse | *Y(n − 1), Y(n) |
| Period 2 | 0 | 1 | 1 | 1 | Period 5 | 1 | 1 | 0 | 0 | Succeeding pulse | Y(N − 1), Y(n) |
| Period 3 | 1 | 1 | 1 | 1 | Period 1 | 0 | 0 | 1 | 1 | Preceeding pulse | Y(n − 4), Y(n − 3) |
| Period 3 | 1 | 1 | 1 | 1 | Period 2 | 0 | 1 | 1 | 1 | Preceeding pulse | Y(n − 4), Y(n − 3) |
| Period 3 | 1 | 1 | 1 | 1 | Period 3 | 1 | 1 | 1 | 1 | Preceeding pulse | *Y(n − 4), Y(n − 3) |
| Period 3 | 1 | 1 | 1 | 1 | Period 4 | 1 | 1 | 1 | 0 | Succeeding pulse | Y(n − 1), Y(n) |
| Period 3 | 1 | 1 | 1 | 1 | Period 5 | 1 | 1 | 0 | 0 | Succeeding pulse | Y(n − 1), Y(n) |
| Period 4 | 1 | 1 | 1 | 0 | Period 1 | 0 | 0 | 1 | 1 | Preceeding pulse | Y(n − 4), Y(n − 3) |
| Period 4 | 1 | 1 | 1 | 0 | Period 2 | 0 | 1 | 1 | 1 | Preceeding pulse | *Y(n − 4), Y(n − 3) |
| Period 4 | 1 | 1 | 1 | 0 | Period 3 | 1 | 1 | 1 | 1 | Succeeding pulse | Y(n − 1), Y(n) |
| Period 4 | 1 | 1 | 1 | 0 | Period 4 | 1 | 1 | 1 | 0 | Succeeding pulse | Y(n − 1), Y(n) |
| Period 4 | 1 | 1 | 1 | 0 | Period 5 | 1 | 1 | 0 | 0 | Succeeding pulse | Y(n − 1), Y(n) |
| Period 5 | 1 | 1 | 0 | 0 | Period 1 | 0 | 0 | 1 | 1 | Preceeding pulse | *Y(n − 4), Y(n − 3) |
| Period 5 | 1 | 1 | 0 | 0 | Period 2 | 0 | 1 | 1 | 1 | Succeeding pulse | Y(n − 1), Y(n) |
| Period 5 | 1 | 1 | 0 | 0 | Period 3 | 1 | 1 | 1 | 1 | Succeeding pulse | Y(n − 1), Y(n) |
| Period 5 | 1 | 1 | 0 | 0 | Period 4 | 1 | 1 | 1 | 0 | Succeeding pulse | Y(n − 1), Y(n) |
| Period 5 | 1 | 1 | 0 | 0 | Period 5 | 1 | 1 | 0 | 0 | Succeeding pulse | Y(n − 1), Y(n) |

Figure 10:
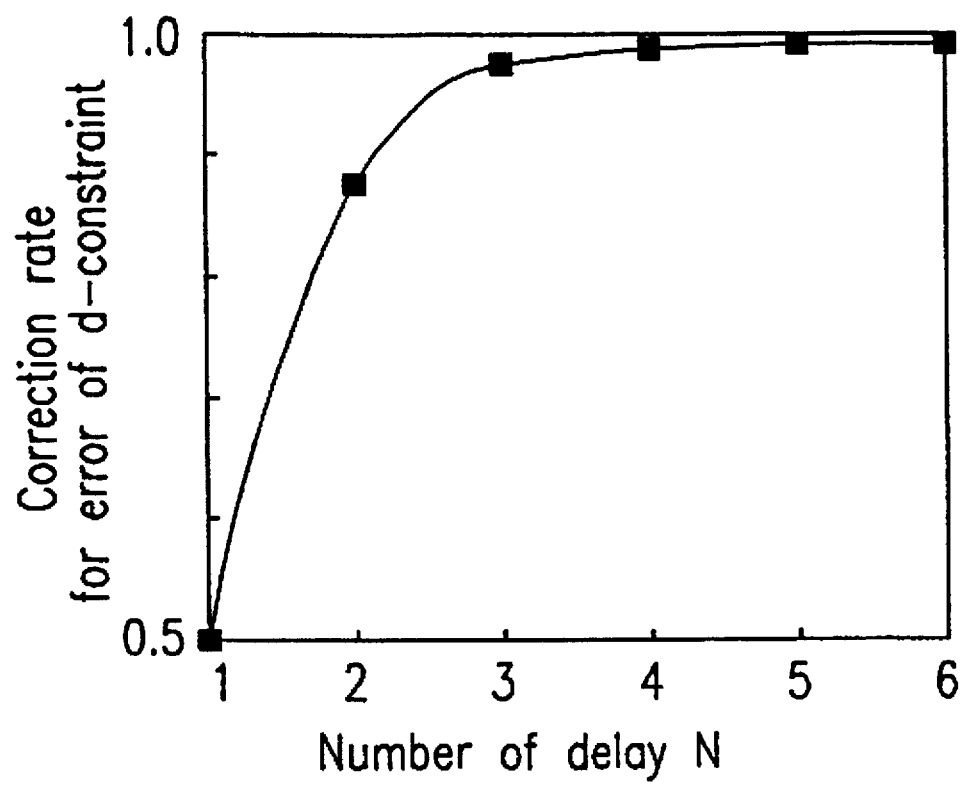
FIG. 10 is a graph illustrating a relationship between the number of divisions of the detection window N and the correction rate.

Optimization of N will be described below, where N is the number of divisions of the detection window (corresponding to the number of the delays in the above description). FIG. 10 is a graph illustrating a relationship between the number of divisions of the detection window N and the correction rate. FIG. 10 is the results of the actual measurements using a circuit having a similar construction as in FIGS. 1 and 9. The circuit and the logic which are illustrated in FIG. 1 and Table 1, respectively, are used for N=3, and the circuit and the logic which are illustrated in FIG. 9 and Table 2, respectively, are used for N=5. The correction rate for the error that the d-constraint is not satisfied for d=2 is 95% or greater in the case of N=3 (three delays). The correction rates for N=4 or greater are not very much improved. Therefore, when considering downsizing of hardware or implementation of high speed processing, N=3 (circuit in FIG. 1) is more preferable.

Although the difference in the delay amounts are set to be about −T/3 and T/3, other values can be chosen. Here, it is assumed that three delays delay the signal P by (Td−dly), Td, and (Td+dly), respectively. In the case of N=3, however, it is preferable that T/5<dly<T/2. More preferably, the difference dly is equal to T/3 since error correction rate is relatively high irrespective of variation in disk material and reproducing condition.

Figure 11:
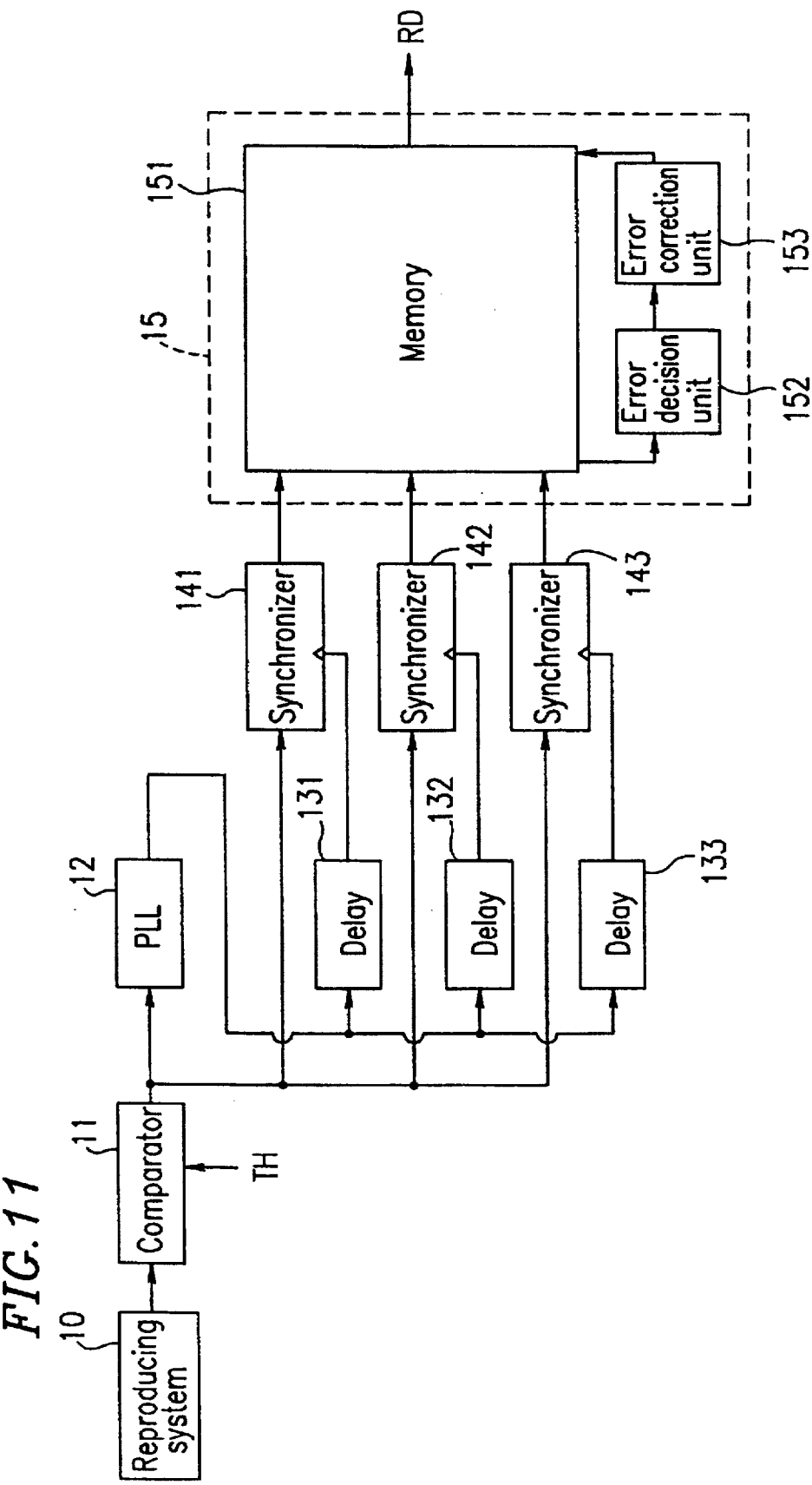
FIG. 11 is a block diagram illustrating a construction where a plurality of clocks with different synchronizers.

Furthermore, in the above example, it is described that the signal P is delayed by the N (N is an integer equal to or greater than 3) delays and is synchronized by a single signal CLK. However, the signal P can be synchronized at the synchronization timing of N signals CLK(1)−CLK(N) which are generated by delaying a signal signal CLK by N delays. FIG. 11 is a block diagram illustrating s construction where a plurality of clocks with different synchronizers.

Moreover, although the construction of the above example is such that the error is corrected by using only the d-constraint of the (d, k) constraint, it is possible to have a similar construction where the error is corrected by using the k-constraint. It is also possible to correct the error by using both the d-constraint and the k-constraint. However, in a case of a high density optical disk, the error that the d-constraint is not satisfied affects the bit error rate more greatly than the error that the k-constraint is not satisfied does. Therefore, it is more effective to correct the error based on the d-constraint.

EXAMPLE 2

Figure 12:
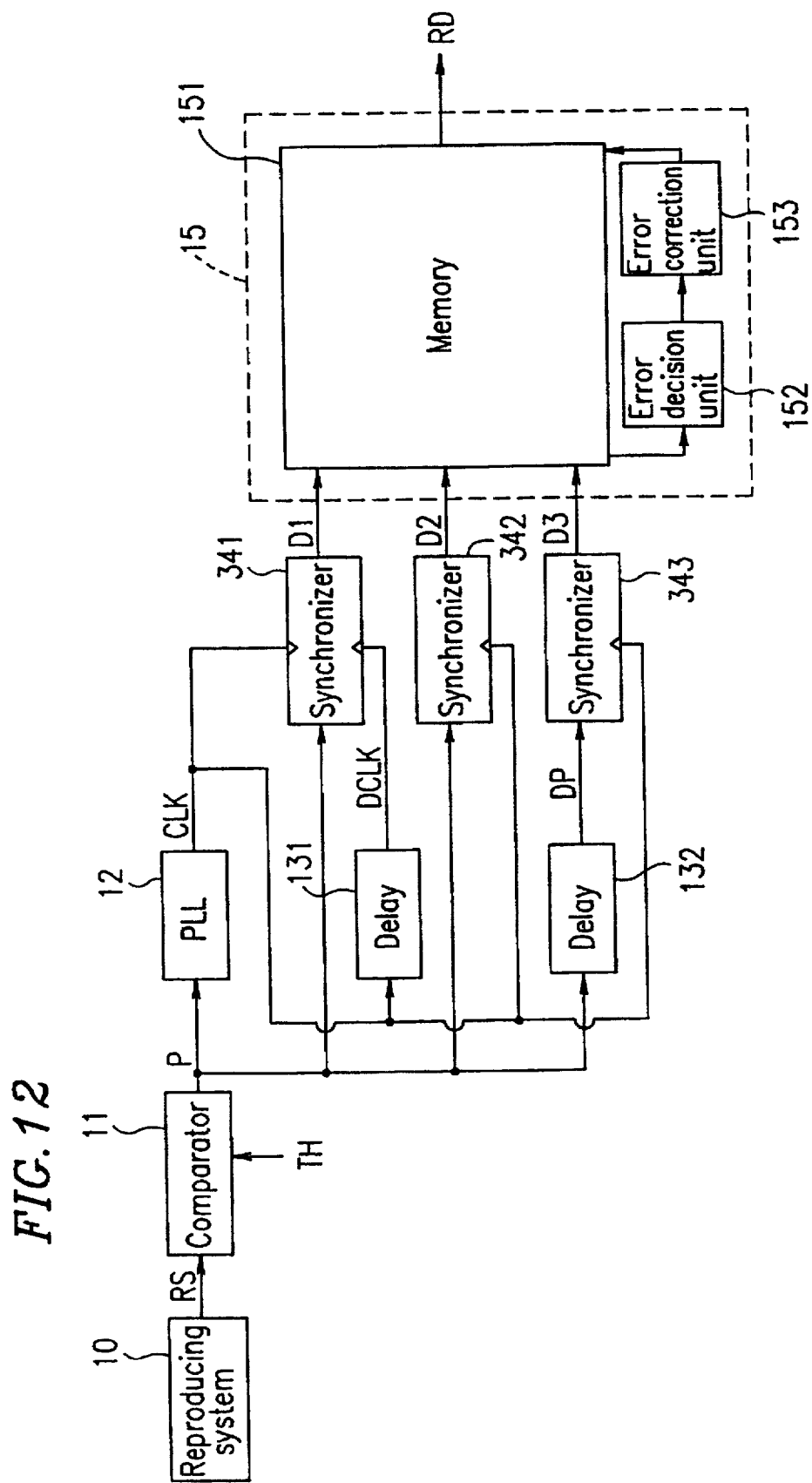
FIG. 12 is a block diagram of a second example of a data detection apparatus according to the present invention.
Figure 13:
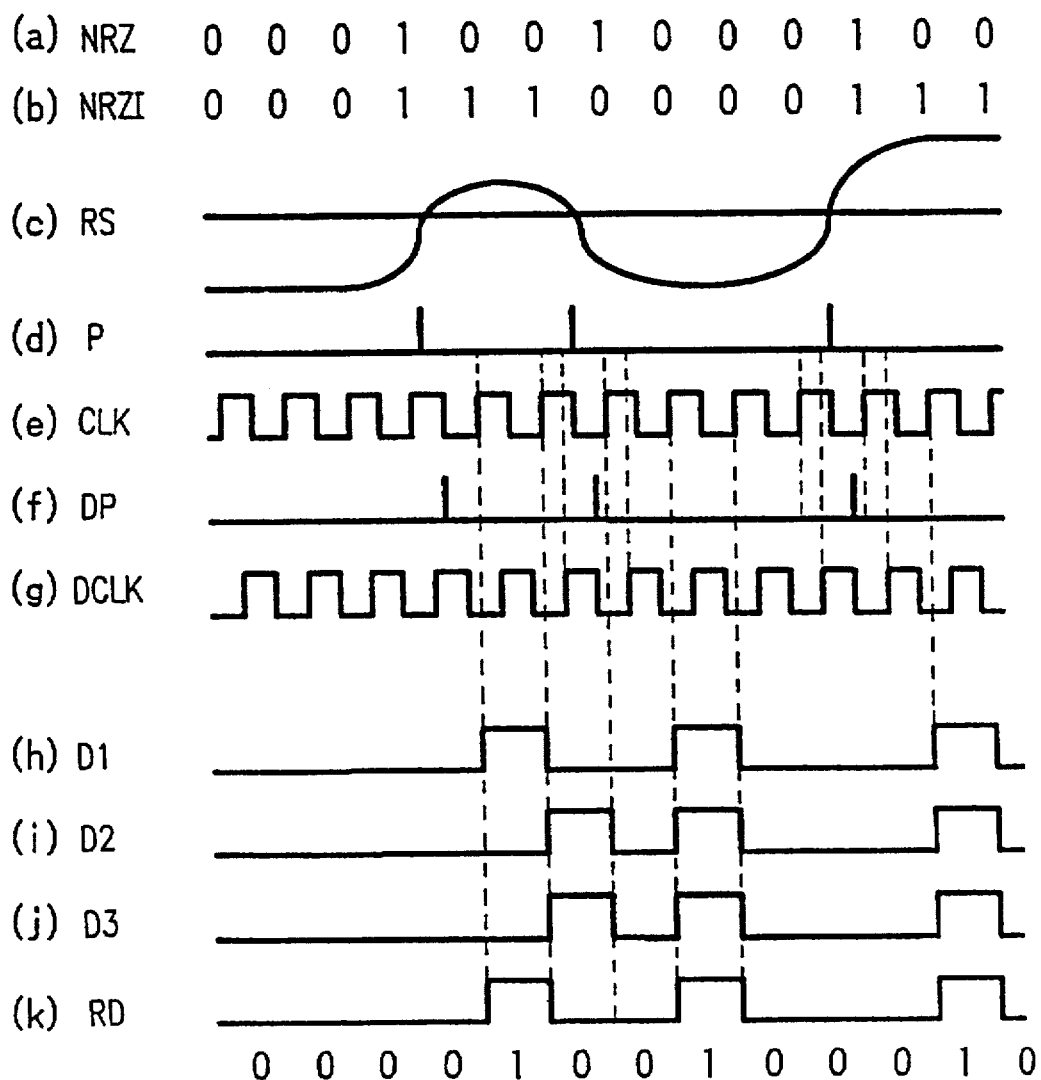
FIG. 13 is a timing chart in the second example.

FIG. 12 is a block diagram of a second example of a data detection apparatus according to the present invention. In FIG. 12, a reproducing system 10, a comparator 11, a PLL 12, delays 131 and 132, and a decision device 15 function similarly as in FIG. 1. FIG. 13 is a timing chart in the second example.

The delay 132 receives a signal P and generates a signal DP ((f) of FIG. 13) by delaying the signal P ((d) of FIG. 13) by T/3. Here, T is a clock cycle of the reproduced signal RS ((c) of FIG. 13). The delay 131 delays the signal CLK by T/3 and outputs a signal DCLK ((g) of FIG. 13) to the synchronizer 341.

The synchronizer 341 makes the signal D1 to be "1" at the timing that the signal DCLK becomes "1" for the first time after the rise edge of the signal P, and makes the signal to be "0" after the time T, thereby obtaining a signal synchronized by the signal DCLK. By the signal CLK, the synchronizer 341 synchronizes the signal which was synchronized by signal DCLK in order to match the timing for the signals D2 and D3 that make transitions at an edge of the signal CLK, and outputs it as a signal D1 ((h) of FIG. 13).

The synchronizer 342 makes the signal D2 to be "1" at the timing that the signal CLK becomes "1" for the first time after the rise edge of the signal P, and makes the signal to be "0" after the time T, thereby obtaining a signal synchronized by the signal CLK. Again by the signal CLK, the synchronizer 342 synchronizes the signal which was synchronized by the signal CLK in order to match the timing for the signal D1, and outputs it as a signal D2 ((i) of FIG. 13).

The synchronizer 343 makes the signal D3 to be "1" at the timing that the signal CLK becomes "1" for the first time after the rise edge of the signal DP, and makes the signal to be "0" after the time T, thereby obtaining a signal synchronized by the signal CLK. Again by the signal CLK, the synchronizer 343 synchronizes the signal which was synchronized by the signal CLK in order to match the timing for the signal D1, and outputs it as a signal D3 ((j) of FIG. 13).

Although the delay time is set to be T/3 in the second example, it may be other values.

In the second example, a similar effect as in the first example can be obtained by a simpler circuit construction by using above-described construction.

EXAMPLE 3

Figure 14:
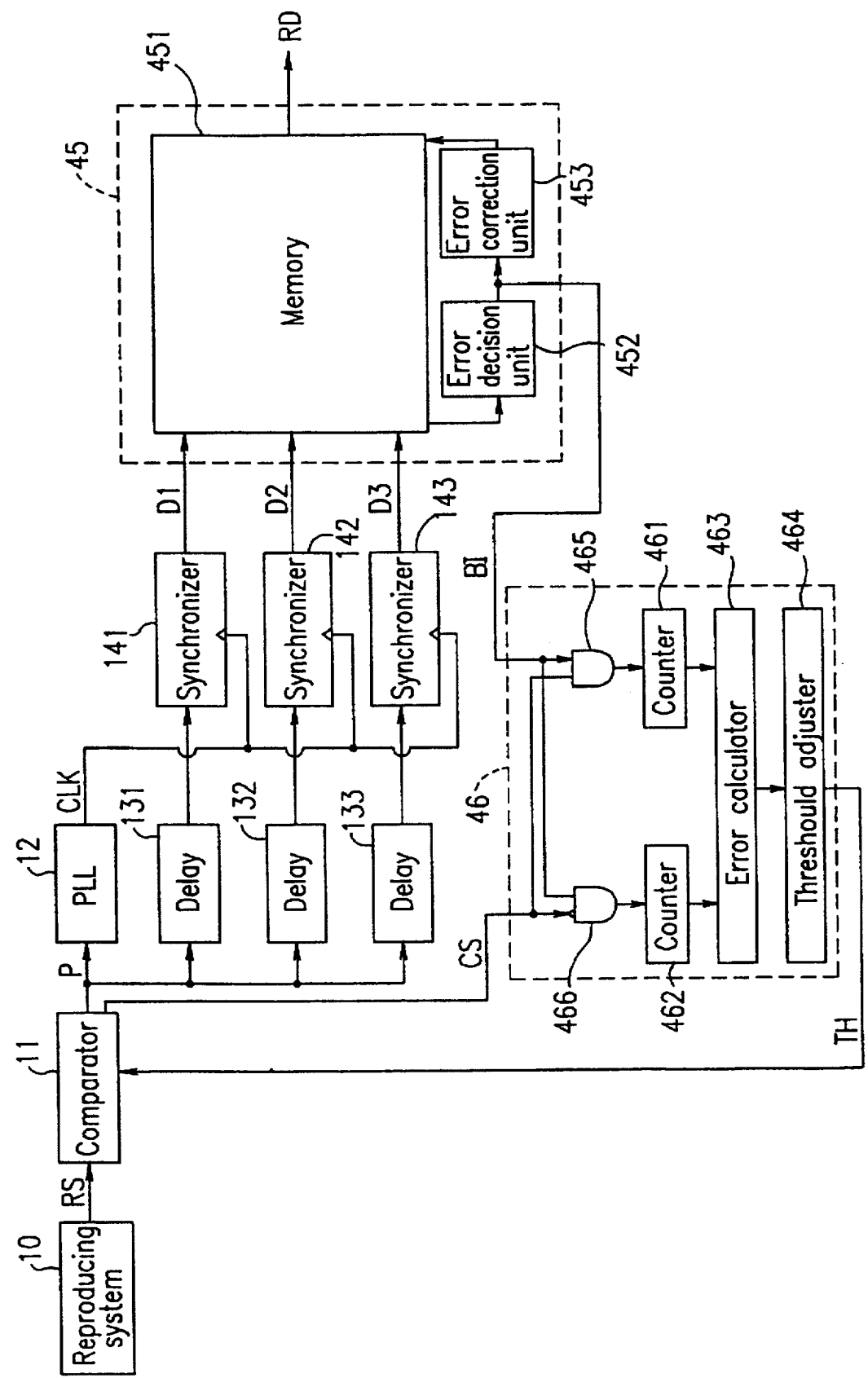
FIG. 14 is a block diagram of a third example of a data detection apparatus according to the present invention.

FIG. 14 is a block diagram of a third example of a data detection apparatus according to the present invention. In FIG. 14, the reproducing system 10, the comparator 11, the PLL 12, the delays 131–133, and the synchronizer 141–143 function similarly as in FIG. 1.

What are different from the construction of FIG. 1 are a decision device 45, and a threshold controller 46. The comparator 11 outputs a signal P as well as it outputs a signal CS representing the NRZI symbol ((b) of FIG. 2) based on the signal RS to the threshold controller 46.

The decision device 45 includes a memory 451, an error decision unit 452 and an error correction unit 453. The decision device 45 reproduces a reproduced signal D2 from the signals D1–D3 as well as it detects that the data represented by the signal D2 do not satisfy the predetermined constraint of the recorded binary data (i.e., the "bit irregular") and outputs a bit irregular signal BI to the threshold controller 46. Here, the predetermined constraint is d-constraint. This bit irregular signal BI takes "1" when the signal D2 represents "01010" or "0110", and otherwise takes "0". In other respects, the memory 451, the error decision unit 452 and an error correction unit 453 function similarly as the memory 151, the error decision unit 152 and an error correction unit 153.

The threshold controller 46 includes counters 461 and 462, an error calculator 463, and a threshold adjuster 464, and AND gates 465 and 466. The AND gate 465 outputs "1" when the bit irregular signal BI and the signal CS are both "1". Otherwise, the AND gate 465 outputs "0". The AND gate 466 outputs "1" when the bit irregular signal BI is "1" and the signal CS is "0". Otherwise, the AND gate 466 outputs "0".

The counter 461 counts the number of the times when the output of the AND gate 465 becomes "1" during a predetermined period. This count value corresponds to the number of the bit irregulars of the symbol "1" in the NRZI symbol occurred during the predetermined period.

The counter 462 counts the number of the times when the output of the AND gate 466 becomes "1" during a predetermined period. This count value corresponds to the number of the bit irregulars of the symbol "0" in the NRZI symbol occurred during the predetermined period.

The error calculator 463 subtracts the count value of the counter 462 from the count value of the counter 461 and outputs the data representing the difference value thus obtained to the threshold adjuster 464. This difference value corresponds to the difference in the count values of the bit irregulars of "1" and "0" occurred during the predetermined period.

FIG. 15 is a diagram illustrating a relationship between the threshold value TH and the signal binarized by NRZI (signal RS). In FIG. 15, (a) represents a threshold value of the optimum level, (b) represents a threshold value whose level is greater than the optimum level, and (c) represents a threshold value whose level is less than the optimum level. If the threshold value TH shifts from the optimum value, then as can be seen from FIG. 15, the sign of the bit irregular becomes different depending on the direction of the shift (whether the level of the threshold value TH increases or decreases). That is, if the threshold value TH becomes larger than the optimum level (a), then the bit irregular of "1" occurs in the NRZI symbol. If the threshold value TH becomes smaller than the optimum level (a), then the bit irregular of "0" in the NRZI symbol occurs.

The threshold adjuster 464 receives from the error calculator 463 data corresponding to the difference in the count values of the bit irregulars of "1" and "0" which occur during a predetermined period and varies the level of the threshold value TH in accordance with the difference in the count values. Specifically, when the difference in the count values is positive, that is, when the count value of the bit irregulars of "1" is greater than the count value of the bit irregulars of "0", the level of the threshold value is decreased. When the difference in the count values is negative, that is, when the count value of the bit irregulars of "1" is less than the count value of the bit irregulars of "0", the level of the threshold value is increased.

By having the above-described construction, the occurrence frequency of the bit irregular can be obtained from the retrieved signal. By utilizing the frequency of the bit irregular of "1" and "0", the threshold value can be adjusted automatically.

Also, if the error calculator 463 first weighs the count values from the counters 461 and 462 depending on the kind of the medium, the characterics of the apparatus, or the like, and then calculates the difference, a more precise adjustment of the threshold value can be conducted.

Furthermore, in the third example, the step of changing the threshold value is preferably large when the difference in the count values is large and the step of changing the threshold value is preferably small when the difference in the count values is small. As a result, when the threshold value is largely shifted from the optimum level, it can be brought toward the optimum level in a short time, and when the difference between the threshold value and the optimum level becomes small, it can be brought toward the optimum level without repeating the overshooting.

According to the present invention, the position within the detection window of the timing at which the analogue signal reproduced from a recording medium or the like crosses a predetermined threshold value is detected, and an error in the data is corrected with respect to the timing position within the detection window. Consequently, at least following effects can be obtained.

Since the position within the detection window can be detected with high resolution, the correction rate of an error can be improved.

The delay amount of the N delays which delay the pulse signal obtained from the reproduced analogue signal can be varied, and the controller which controls each delay amount is further included. As a result, the decision can be made on the bit irregular which is the deviation of a specific portion of the retrieved binary signal from a predetermined constraint of the binary data recording signal. It is, therefore, possible to improve the correction rate of an error.

The bit irregulars of the retrieved binary signal can be counted, and the threshold value during binarization can be varied depending on the magnitude of the count of the bit irregulars of "1" and "0". As a result, the correction rate of an error can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data detection apparatus for retrieved binary data modulated in conformity with the (d, k) constraint from an analog signal, comprising:
    a timing extracting unit for generating a timing signal representing the timing at which the analog signal crosses the threshold value;
    a clock generating unit for generating a clock signal having a cycle corresponding to one bit of the binary data from the timing signal;
    a timing position detecting unit for detecting a position in the cycle of the timing signal; and
    an error correcting unit for correcting an error in the binary data in accordance with the detected position.

2. A data detection apparatus according to claim 1, wherein:
    the timing position detection unit comprises a delay which delays the timing signal by a certain delay amount, thereby generating a delay timing signal, and a delay which delays the clock signal by a certain delay amount, thereby generating a delay clock signal, and a synchronizer which synchronizes the timing signal and the delay timing signal by the clock signal and the delay clock signal, thereby generating N data signals corresponding to the delay timing signal and the delay clock signal; and
    the error correcting unit corrects an error in the binary data based on the N data signals.

3. A data detection apparatus according to claim 1, wherein:
    the timing position detecting unit comprises a delay circuit which delays the timing signal by different delay amounts, thereby generating N delay timing signals respectively (N is a natural number equal to or greater than two), and
    N synchronizers which synchronizes the N delay timing signals by the clock signal, thereby generating N data signals in accordance with the N delay timing signals; and
    the error correcting unit corrects an error in the binary data based on the N data signals.

4. A data detection apparatus according to claim 3, wherein the timing position detection unit generates three delay timing signals, and the timings represented by the delay timing signals are shifted by T/3 to one another, where T is the cycle of the clock signal.

5. A data detection apparatus according to claim 1, wherein:

the timing position detecting unit comprises a delay which delays the clock signal by different delay amounts, thereby generating N delay clock signals respectively (N is a natural number equal to or greater than 2), and N synchronizers which synchronize the timing signal by the delay clock signal, thereby generating N data signals in accordance with the N delay clock signals; and the error correcting unit corrects an error in the binary data based on the N data signals.

6. A data detection apparatus according to claim 3, wherein the timing position detection unit generates three delay clock signals, and the timings represented by the delay clock signals are shifted by T/3 to one another, where T is the cycle of the clock signal.

7. A data detection apparatus according to claim 1, wherein the error correcting unit comprises a first counter which counts the number of irregulars of bit "1" for which the number of consecutive "1"s of the binary data does not reach a predetermined number, and a second counter which counts the number of irregulars of bit "0" for which the number of consecutive "0"s of the binary data does not reach a predetermined number, and a threshold controller which varies the threshold value in accordance with the counts of the irregulars of bit "1" and the irregulars of bit "0".

8. A data detection apparatus according to claim 7, wherein the threshold controller varies the step at which the threshold value is varied, in accordance with the difference in the counts of the irregulars of bit "1" and the irregulars of bit "0".

* * * * *